(12) United States Patent
Reddy et al.

(10) Patent No.: US 7,386,009 B2
(45) Date of Patent: Jun. 10, 2008

(54) METHOD AND APPARATUS FOR TRANSMISSION OF INTERNET CONTROL MESSAGE PROTOCOL MESSAGES AS SHORT MESSAGE SERVICE (SMS) MESSAGES IN A COMMUNICATIONS NETWORK COMPRISED OF MOBILE STATIONS

(75) Inventors: Gautam G. Reddy, King of Prussia, PA (US); Prabhakar R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 757 days.

(21) Appl. No.: 10/446,535

(22) Filed: May 28, 2003

(65) Prior Publication Data
US 2004/0039782 A1    Feb. 26, 2004

Related U.S. Application Data

(60) Provisional application No. 60/384,183, filed on May 29, 2002.

(51) Int. Cl.
*H04J 3/16* (2006.01)
*H04L 12/56* (2006.01)
*H04Q 7/20* (2006.01)

(52) U.S. Cl. .................... 370/466; 370/401; 455/466
(58) Field of Classification Search ........ 370/466–467, 370/469, 338; 455/466, 511
See application file for complete search history.

(56) References Cited

U.S. PATENT DOCUMENTS

| | | | |
|---|---|---|---|
| 5,950,123 A | 9/1999 | Schwelb et al. | |
| 6,321,257 B1 * | 11/2001 | Kotola et al. | 709/219 |
| 6,351,648 B1 * | 2/2002 | Karapetkov et al. | 455/466 |
| 6,421,707 B1 | 7/2002 | Miller et al. | |
| 6,487,602 B1 * | 11/2002 | Thakker | 709/230 |
| 7,257,122 B1 * | 8/2007 | Keturi | 370/401 |
| 2001/0017862 A1 * | 8/2001 | Tokuyo et al. | 370/401 |
| 2002/0045442 A1 * | 4/2002 | Silen et al. | 455/420 |
| 2002/0150041 A1 * | 10/2002 | Reinshmidt et al. | 370/216 |
| 2003/0054844 A1 * | 3/2003 | Anvekar et al. | 455/466 |
| 2003/0058827 A1 | 3/2003 | Chow et al. | |

OTHER PUBLICATIONS

WAP Forum, Wireless Control Message Protocol, Jun. 2001, Version 24, pp. 1-26.*

* cited by examiner

*Primary Examiner*—Chi Pham
*Assistant Examiner*—Tri H. Phan
(74) *Attorney, Agent, or Firm*—Volpe and Koenig, P.C.

(57) ABSTRACT

In one aspect of the invention signal/control messages are embedded as packets in the payloads of SMS messages. The SMS messages are transmitted in a cellular network employing SMPP protocol. SMS messages intended to traverse an TCP/IP network are introduced to the TCP/IP network employing ICMP protocol. The protocol conversions are performed by a message center (MC), such as a SMS center or an SGSN in a cellular network or a WLAN Access Router when the SMS message is forwarded to a WLAN. The SMS messages are typically created by a mobile user, which is also capable of receiving the SMS messages having a signal/control message in the SMS message payload.

47 Claims, 4 Drawing Sheets

METHOD AND APPARATUS FOR TRANSMISSION OF INTERNET CONTROL MESSAGE PROTOCOL MESSAGES AS SHORT MESSAGE SERVICE (SMS) MESSAGES IN A COMMUNICATIONS NETWORK COMPRISED OF MOBILE STATIONS

CROSS REFERENCE TO RELATED APPLICATION(S)

This application claims priority from U.S. provisional application No. 60/384,183 filed May 29, 2002, which is incorporated by reference as if fully set forth.

FIELD OF THE INVENTION

The present invention relates to transmission of SMS (Short Message Service) message through different wireless systems, such as Cellular Networks, Wireless Local Area Networks (WLANs) and any transmission control protocol/internet protocol (TCP/IP) based network (e.g. internet), and more particularly the translation of these messages from Short Message Peer-to-Peer (SMPP) protocol to Internet Control Message Protocol (ICMP) and vice-versa.

BACKGROUND

The Short Message Service (SMS) is a text message received by a Mobile Station (MS) in 2G cellular system or User Equipment (UE) in 3G Cellular system or any terminal in a network capable of receiving a text message as specified in the SMPP protocol. An MS or UE can also generate the text message, which is known as mobile originated SMS. SMS Messages in the Cellular network are processed in the core network by an SMS center. The SMS center is responsible for processing incoming messages from Non-mobile (Cellular) entities know as External Short Message Entities (ESMEs), validating the subscriber and delivering the message to the mobile in the cellular network. If the MS or UE is not in the home network but is roaming in another cellular network which is known to the home network, and the MS or UE receives an SMS message, the SMS message is delivered to the MS or UE in the roaming network via an SS7 signaling network.

An (MS) or a UE in a 2.5G (such as GPRS network) or 3G such as a $3^{rd}$ generation partnership project (3GPP) cellular system, which is running Internet Protocol-level (IP-level) applications, such as MobileIP, etc., has a need to send and/or receive IP-level signaling/control packets. Examples are Internet Control Message Protocol (ICMP) messages related to MobileIP protocol which, for example, are typically used to report a problem in the communication environment. These signaling/control IP packets are presently sent to, and received by, the MS over the air interface using transport/physical channels such as a dedicated channel (DCH), etc.

Hereinafter a UE, MS or a wireless transmit and/or receive unit (WTRU) shall be used interchangeably and includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

SUMMARY

The present invention is utilized to great advantage in two different applications, namely:

1. SMS messages traveling between cellular and TCP/IP networks employ SMPP Protocol in the Cellular Network and ICMP in the TCP/IP network. Therefore an SMS center is used to convert SMPP protocol employed in the cell to ICMP in the TCP/IP network and converting ICMP received from the TCP/IP network to SMPP protocol employed in the cell.

2. WTRUs in 2.5G and 3G and which are capable of operating in a TCP/IP environment need to send and/or receive IP-level signaling/control packets (such as ICMP messages) which are transmitted through prevailing Transport/Physical Channels and these message take a different path than the SMS messages. The ICMP message is converted to an SMS message and sent as SMS message and the WTRU converts them as SMS messages and vice versa.

BRIEF DESCRIPTION OF THE DRAWING(S)

The invention will be understood from a consideration of the accompanying detailed description and drawings, wherein like elements are designated by like numerals and wherein.

DETAILED DESCRIPTION OF THE PREFERRED EMBODIMENT(S)

Figure 2:
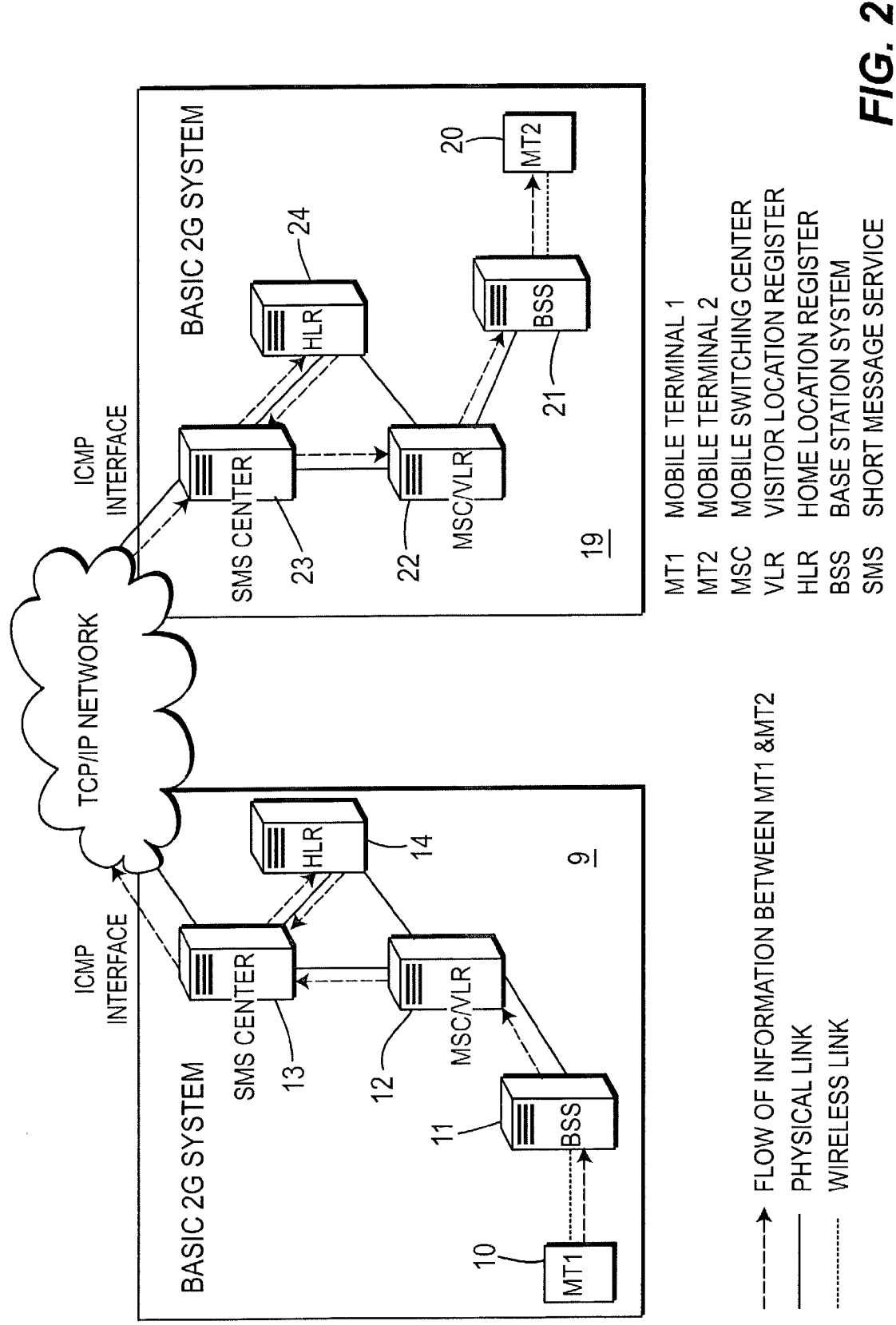
FIG. 2 is a block diagram of a first embodiment of the present invention described in application (1) above, wherein SMS messages are sent over an IP network.

A first embodiment of the present invention is shown in FIG. 2. In this embodiment MS 10 sends SMS messages over a TCP/IP network using ICMP messages. It should be understood that any mobile unit, in all embodiments of the invention as well as FIG. 2, receiving an SMS message with ICMP information and any mobile unit sending an ICMP message as an SMS message, inherently has IP functionality. The example shown in FIG. 2 depicts two (2) cellular systems 9 and 19. As shown, the SMS Center 13 has an ICMP interface. This permits SMS center 13 to connect to the TCP/IP network. The SMS center converts an SMS message into an ICMP message and inserts into the ICMP header an indication that this is an SMS message. This operation is performed by all SMS centers in all other embodiments of the invention, as well as FIG. 2. The routing of the SMS message is performed through a TCP/IP network. MT1 (10) creates an SMS message which reaches SMS Center 13 through the base station system (BSS) 11 and mobile switching center/visitor location register (MSC/VLR) 12. The home location register (HLR) 14 is a standard network element which contains transient and permanent subscriber information such as subscriber location, subscription data and feature activation status of a wireless subscriber.

The SMS 13 center sends an ICMP message through the TCP/IP network to an SMS center 23 in cellular network 19. The ICMP message is converted to an SMS message and sent to MT2 (20) via MCS/VLR 22 and BSS 21.

The MSC function of MSC/VLRs, 12 and 22 is the receipt of incoming calls from mobiles. The VLR function of each of the MSC/VLRs 12 and 22 is to act as a temporary repository for profile information and also functions as pointer to the service MSC.

Figure 1:
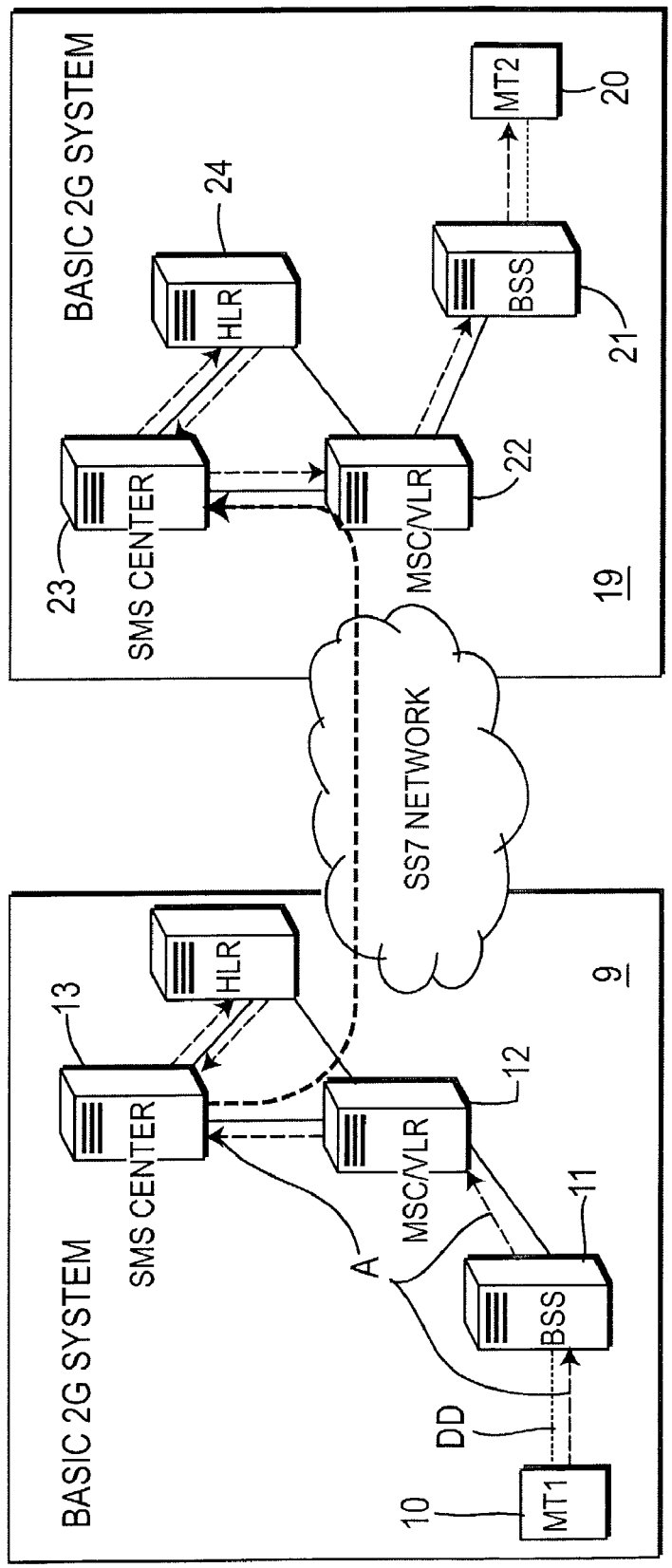
FIG. 1 is a block diagram of the SMS message flow in accordance with the prior art and is useful in understanding the present invention.

The conventional technique, employed in FIG. 1, conveys SMS messages from the SMS center 12 in cellular network 9 to the SMS center 23 in cellular network 19 through an SS7 network. There is no capability of providing signal/control messages in the manner of the present invention.

Figure 3:
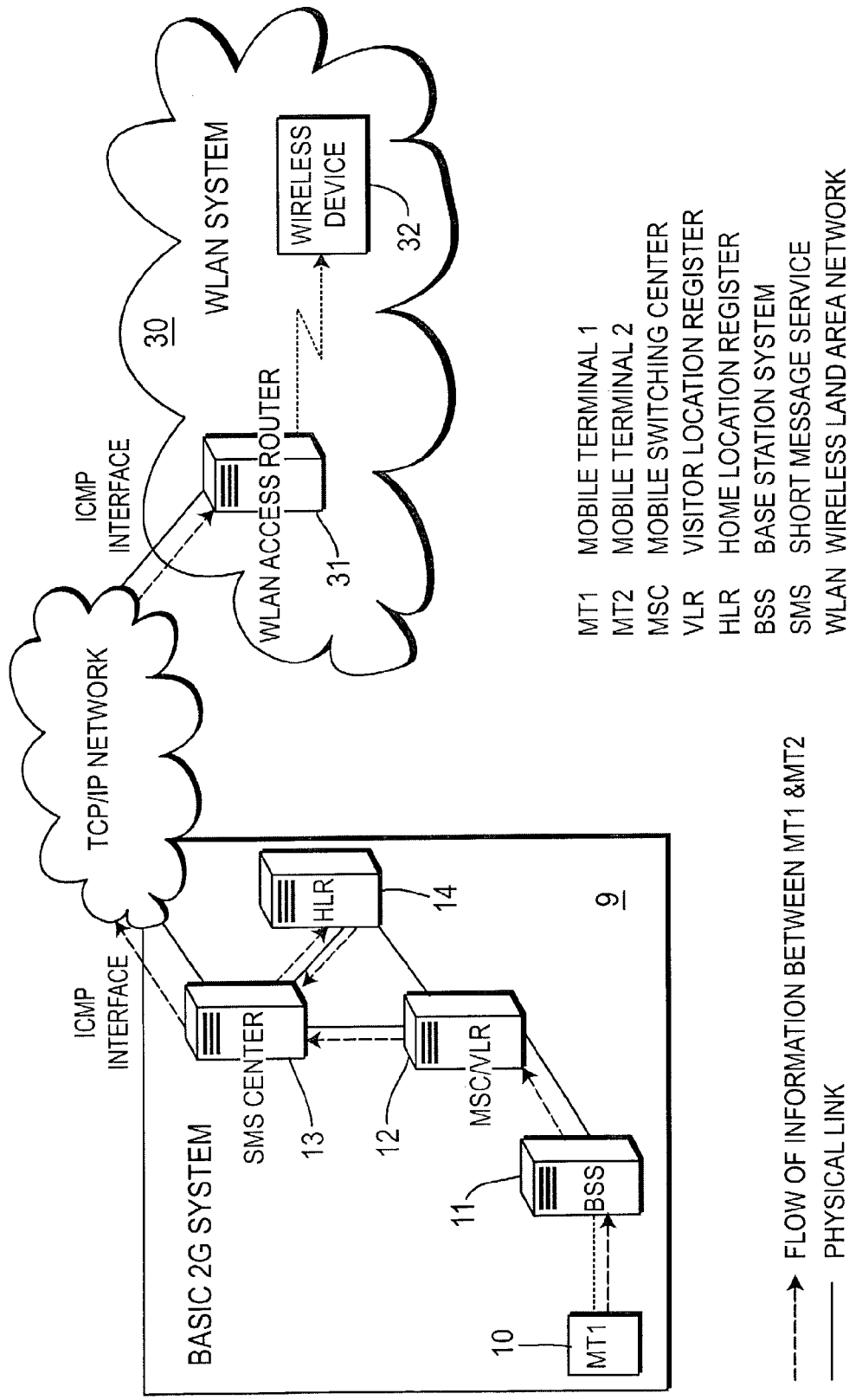
FIG. 3 is a block diagram of an alternative embodiment which is based on the first embodiment and which sends SMS pages from a cellular system to a wireless local area network (WLAN) system.

A similar capability is extended to sending SMS pages from cellular systems to Wireless Local Area Network systems (WLANs) and vice-versa as shown in FIG. 3. However, the WLAN access router 31 sends the ICMP message using ICMP protocol to the wireless device 32 since the WLAN system does not support SMS protocol. The MT 10 and wireless device 32 may have send and receive capabilities as is described below with regard to the embodiments shown in FIGS. 4 and 5. For example, the mobile users in the networks 9 and 19 are interchangeable.

The benefit of the first embodiment is that the limitations of sending an SMS message from one SMS center to another is not an inter-connected cellular system, but a ubiquitous IP network. Additionally, the ICMP messages are fast and, as control signals, they take priority over data signals. The SMS message can be sent to any other network that has an ICMP interface, which is the basic protocol for a TCP/IP based network. Although the preferred embodiment employs an SMS center for the protocol conversion capability, it should be understood that any unit having similar capabilities may be utilized.

A second embodiment of the present invention is directed to the transmission of the signaling/control TCP/IP-packets, such as ICMP messages, as SMS messages. The SMS messages are created (known as mobile-originated SMS) at a WTRU, MS or UE 10 (having IP functionality) by embedding the signaling/control TCP/IP packets as the SMS payload. Sending Mobile Originated SMS is prior art but sending ICMP messages in the SMS payload is part of the invention. This approach reduces the amount of overhead over the air interface. It may also benefit from the built-in robustness features of SMS delivery, such as automatic retransmission in case of transmission errors.

Figure 4:
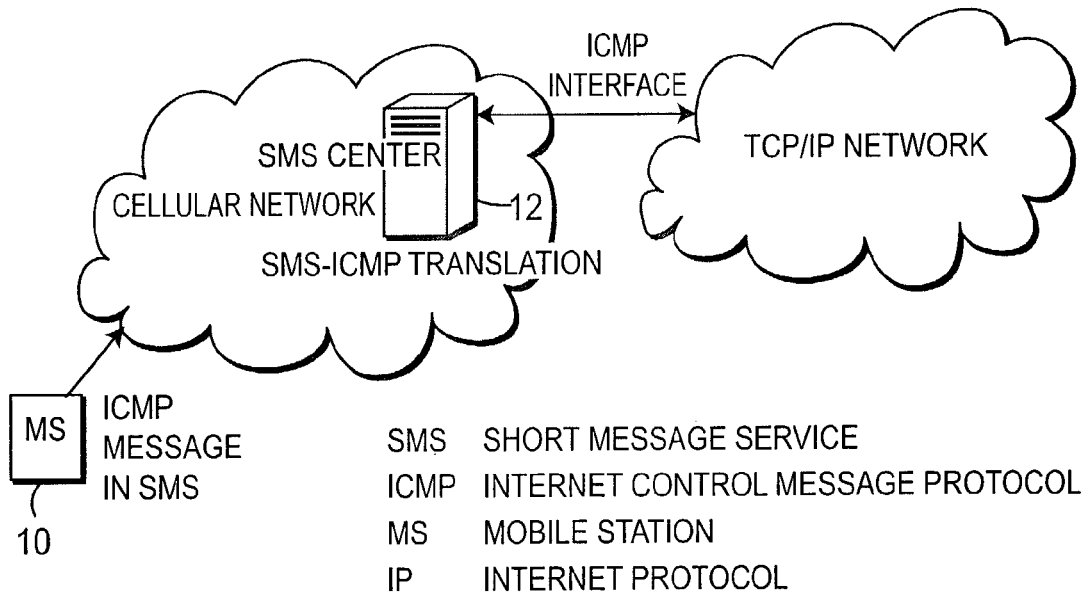
FIG. 4 is a block diagram of a second embodiment described in application (2) above and showing a system which transmits TCP/IP-packets as SMS messages in accordance with a first embodiment of the present invention.

The translation from the SMS message to the ICMP message and vice versa is performed at the SMS center 12 forming part of the cellular network 9, as shown in FIG. 4. Alternatively, the translation from SMS to ICMP message is performed at the serving GPRS support node (SGSN) 33 provided within a cellular network, as shown in FIG. 5.

Figure 5:
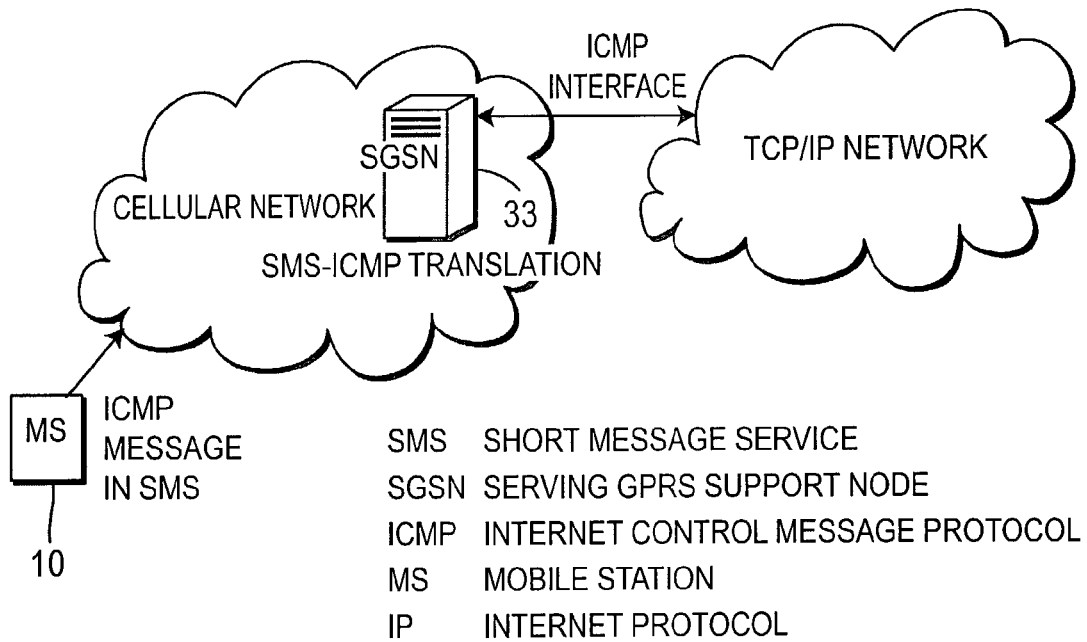
FIG. 5 is a block diagram of a system of the second embodiment which transmits IP-packets as SMS messages in accordance with a first alternative of the second embodiment of the present invention.

Also for the embodiments of FIGS. 4 and 5, the mobile (WTRU) 10 has the capability of receiving an ICMP message embedded in the SMS message (in the SMS pay load) as well as having the ability to send such an SMS message. This capability is indicated in the embodiments of FIGS. 4 and 5 by the arrows indicating the ability to send and receive an ICMP message in the SMS message.

The alternative second embodiments shown in FIGS. 4 and 5 permit a potentially reduced overhead and robust mechanism to send IP-level signaling/control messages over the air interface. This innovation also allows for an independent path for ICMP messages to reach the IP based network through the SMS message. For a mobile in the TCP/IP environment, the ICMP messages are sent as part of the regular signals, be it in 2.5G or 3G, but sending the ICMP messages as part of the SMS message adds another independent path of sending and receiving ICMP signals and adds to the robustness.

What is claimed is:

1. A method for handling of a short message system (SMS) message for transfer from a wireless cellular network to a transmission control protocol/internet protocol (TCP/IP) network, comprising:
   a) receiving the SMS in the cellular network, said message being of a given format embedded in a payload with at least one of a signaling and control message;
   b) converting said SMS message in said given format in the cellular network to an internet control message protocol (ICMP) compatible with the TCP/IP network; and
   c) conveying the converted message to the TCP/IP network for further transfer to a second cellular network identified by said message.

2. The method of claim 1 wherein step (b) further comprises:
   inserting in a header of the ICMP message an indication that it is an SMS message.

3. The method of claim 1 further comprising:
   (d) conveying the ICMP message traversing the TCP/IP network to a second cellular network; and
   (e) converting the ICMP message received in the second cellular network back to said given format message.

4. The method of claim 3 further comprising:
   conveying said given format message at step (e) to a mobile user in the second cellular network employing a protocol compatible with said given format message.

5. The method of claim 1 wherein the given format message is initially created by a mobile user in said cellular network.

6. The method of claim 1 wherein the given format message is created in said cellular network as a short message service (SMS) message.

7. The method of claim 6 wherein the SMS message is created by:
   generating an ICMP message; and
   inserting the ICMP message in the payload of the SMS message.

8. The method of claim 1 wherein the ICMP message is conveyed from the TCP/IP network to a wireless local area network (WLAN) system and the ICMP message received in the WLAN system is conveyed to a user employing the ICMP protocol.

9. The method of claim 8 wherein said given format message received in the WLAN system is conveyed to the user, said user being a wireless user employing a protocol compatible with ICMP protocol.

10. The method of claim 9 wherein said given format message is initially created as an SMS message.

11. The method of claim 9 wherein said given format message is created by:
    creating a ICMP message; and
    inserting the ICMP as a payload in a short message service (SMS) message.

12. A method for conveying messages of a given format in a wireless system, comprising:
    a mobile user located in a given cellular network:
    a) creating an ICMP message;
    b) inserting the ICMP message in payload of a SMS message; and
    c) communicating the SMS message as a message intended to travel into a TCP/IP network;

a first unit in said given cellular network:
  d) receiving said SMS message from said mobile user;
  e) converting the SMS message to an ICMP message protocol; and
  f) conveying the message obtained at step (e) as an ICMP message.

13. The method of claim 12 wherein step (a) comprises:
  g) creating a signal/control ICMP message.

14. The method of claim 12 wherein step (c) further comprises:
  g) sending the ICMP message employing SMPP protocol.

15. The method of claim 14 wherein step (e) converts the SMS message sent using SMPP protocol to ICMP protocol.

16. A method for conveying signal/control packets intended to pass through a TCP/IP network, comprising:
  a mobile user in a given cellular network:
    a) creating an SMS message;
    b) inserting control and data information in a payload of the SMS message; and
    c) sending the SMS message intended to traverse the TCP/IP network employing SMPP protocol;
  a message center in said given cellular network;
    d) receiving the SMS message in SMPP protocol; and
    e) introducing the SMS message into the TCP/IP network employing ICMP protocol.

17. The method of claim 16 wherein step (e) further comprises:
  inserting in a header of the ICMP message an indication that it is an SMS message.

18. The method of claim 16 further comprising a base station in said given cellular network:
  forwarding the message obtained at step (c) to the message center.

19. The method of claim 16 further comprising another message center in another cellular network:
  f) receiving the SMS message employing ICMP protocol obtained at step (e); and
  g) converting the SMS message intended for a user in said another cellular network employing SMPP protocol.

20. The method of claim 19 further comprising another base station in said another cellular network:
  sending the message obtained at step (g) to said user.

21. A method for conveying an SMS message employing ICMP protocol, said message being sent through a TCP/IP network, comprising:
  a message center in said cellular network:
    a) receiving said SMS message employing ICMP protocol from said TCP/IP network, said message being at least one of a signaling and control message, sent as a payload to a mobile user in a cellular network; and
    b) sending said SMS message employing SMPP protocol to said mobile user;
  said mobile user in said cellular network:
    c) receiving the message obtained at step (b) in SMPP protocol.

22. The method of claim 21 further comprising:
  a base station in said cellular network:
    d) receiving said SMS message from said message center; and
    e) conveying the SMS message to said mobile user.

23. A method for conveying an SMS message through a TCP/IP network to a wireless device in a WLAN, comprising:
  an access router:
    a) receiving said SMS message, said message being at least one of a signaling and control message in ICMP protocol as a payload;
    b) translating the SMS message to ICMP message; and
    c) sending said SMS message employing ICMP protocol to said wireless device;
  said wireless device:
    d) receiving the message obtained in step (c) using ICMP protocol.

24. The method of claim 23 further comprising:
  a mobile user in a cellular network:
    e) creating said SMS message to include an ICMP payload and conveying the SMS message to a base station in said cellular network; said base station:
    f) receiving said SMS message from said mobile user; and
    g) conveying the SMS message to a message center in said cellular network; and
    h) said message center transmitting the SMS message to said TCP/IP network employing ICMP protocol.

25. Apparatus for handling short message system (SMS) messages of a given format and moving between wireless cellular and transmission control protocol/internet protocol (TCP/IP) networks, comprising:
  a circuit configured to embed at least one of a signaling and control message in the SMS message;
  a circuit configured for converting said messages in said given format in the cellular network to an internet control message protocol (ICMP); and
  a circuit configured for conveying the converted messages to the TCP/IP network for transfer to a second wireless cellular network identified by said messages, said TCP/IP network eliminating a need for a transport or physical channel.

26. The apparatus of claim 25 further comprising:
  a second circuit for conveying the ICMP message traversing the TCP/IP network to a second cellular network; and
  a circuit for converting the ICMP message received in the second cellular network to said given format message.

27. The apparatus of claim 26 further comprising:
  a third circuit for conveying said given format message from said converting circuit to a mobile user in the second cellular network.

28. The apparatus of claim 25 wherein the given format message is initially created by a mobile user in the first mentioned cellular network.

29. The apparatus of claim 28 wherein the given format message is an SMS message created by:
  a circuit for generating an ICMP message; and
  a circuit for inserting the ICMP message in a payload of the SMS message.

30. The apparatus of claim 25 further comprising:
  a second circuit for conveying the converted ICMP message from the TCP/IP network to a wireless local area network (WLAN) system; and
  a circuit for forwarding the ICMP message received in the WLAN system to a wireless device.

31. The apparatus of claim 27 further comprising:
  a mobile user having a receiver for receiving the given format message using SMPP protocol.

32. The apparatus of claim 25 further comprising:
  a mobile user in said given cellular network having a circuit for creating a ICMP message; and
  a circuit for inserting the ICMP message as a payload in a short message service (SMS) message.

33. The apparatus of claim 25 wherein said converting circuit further comprises:
a circuit for inserting into a header of the ICMP message an indication that it is an SMS message.

34. Apparatus for conveying messages of a given format in a wireless system, comprising:
a mobile user located in a given cellular network comprising:
a circuit for creating an ICMP message;
a circuit for inserting the ICMP message in payload of an SMS message; and
a circuit for communicating the SMS message as a message intended to travel into an TCP/IP network;
a first unit in said given cellular network comprising:
a circuit for receiving said SMS message from said mobile user;
a circuit for converting the SMS message to an ICMP message protocol; and
a circuit for conveying the converted message from said converting circuit as an ICMP message.

35. Apparatus of claim 34 wherein said communicating circuit further comprises:
a circuit for sending the ICMP message employing SMPP protocol.

36. The apparatus of claim 34 wherein the converting circuit translates the SMS message sent using SMPP protocol to ICMP protocol.

37. Apparatus for conveying signal/control packets intended to pass through a TCP/IP network, comprising:
a mobile user in a given cellular network, comprising:
a circuit for creating an SMS message;
a circuit for inserting the signal/control packets in a payload of the SMS message; and
a circuit for sending the SMS message intended to traverse the TCP/IP network employing SMPP protocol; and
a message center in said given cellular network comprising:
a circuit for converting the SMS message to an ICMP message; and
an interface circuit for sending the converted SMS message to the TCP/IP network.

38. The apparatus of claim 37 further comprising a base station in said given cellular network having a circuit for forwarding the message obtained from the mobile user to the message center.

39. The apparatus of claim 37 further comprising another message center in another cellular network, comprising:
a circuit for receiving the SMS message employing ICMP protocol; and
a circuit for converting the SMS message intended for another mobile user in said another cellular network employing SMPP protocol.

40. The apparatus of claim 39 further comprising:
another base station in said another cellular network having a circuit for sending the message obtained from said another message center to said another mobile user.

41. Apparatus for conveying an SMS message employing ICMP protocol, as a payload to a mobile user in a given cellular network from a TCP/IP network, comprising:
a message center in said cellular network, comprising:
a circuit for receiving said SMS message, said message including at least one of a signaling and control message, as a payload;
a circuit for converting the SMS message to an SMPP message; and
a circuit for sending said SMS message employing SMPP protocol to said mobile user;
said mobile user comprising:
a receiver for receiving the message obtained from the message center in SMPP protocol.

42. Apparatus for conveying an SMS message having an ICMP message to a wireless device in a WLAN from a TCP/IP network, comprising:
an access router in said WLAN, comprising:
a receiver for receiving said SMS message, said message being a payload, and including at least one of a signaling and control message; and
a circuit for sending said SMS message to said wireless device;
said wireless device comprising:
a receiver employing a protocol compatible with ICMP for receiving the SMS message obtained from said access router.

43. The apparatus of claim 42 further comprising:
a cellular network supporting SMPP protocol,
a mobile user having a circuit for creating said SMS message and conveying the SMS message to a base station;
said base station having a circuit for conveying the SMS message to a message center; and
said message center comprising a circuit for converting the SMS message using ICMP protocol and a circuit for conveying said converted SMS message to said WLAN through said TCP/IP network.

44. The apparatus of claim 42 wherein said converting circuit further comprises:
a circuit for inserting into a header of the ICMP message an indication that it is an SMS message.

45. A method for handling of a short message system (SMS) message for transfer from a first wireless cellular network to a second wireless cellular network through a transmission control protocol/internet protocol (TCP/IP) network, comprising:
a) receiving the SMS message in the first cellular network employing a protocol compatible with a protocol of said SMS message, said message being of a given format embedded in a payload with at least one of a signaling and control message;
b) converting said SMS message in said given format in the first cellular network to an internet control message protocol (ICMP) compatible with the TCP/IP network;
c) conveying the converted message to the second cellular network through the TCP/IP network;
d) receiving the converted message in the second cellular network employing a protocol compatible with said TCP/IP network; and
e) converting the converted message to a protocol employed by a wireless unit in said second cellular network.

46. The method of claim 45, further comprising:
f) a wireless unit in said first cellular network generating said SMS message employing SMPP protocol.

47. The method of claim 46, the wireless unit in said second cellular network receiving the SMS message in SMPP protocol.

* * * * *

UNITED STATES PATENT AND TRADEMARK OFFICE
CERTIFICATE OF CORRECTION

PATENT NO. : 7,386,009 B2  Page 1 of 1
APPLICATION NO. : 10/446535
DATED : June 10, 2008
INVENTOR(S) : Reddy et al.

It is certified that error appears in the above-identified patent and that said Letters Patent is hereby corrected as shown below:

IN THE SPECIFICATION

At column 1, line 19, before the word "through" delete "message" and insert therefor --messages--.

At column 2, line 16, after the word "these" delete "message" and insert therefor --messages--.

IN THE CLAIMS

At claim 11, column 4, line 57, before "ICMP" delete "a" and insert therefor --an--.

At claim 24, column 6, line 17, delete "and".

At claim 37, column 7, line 33, after the word "message;" delete "and".

At claim 37, column 7, line 36, after "col;" delete "and".

Signed and Sealed this

Twenty-sixth Day of May, 2009

JOHN DOLL
*Acting Director of the United States Patent and Trademark Office*